Patented May 16, 1944

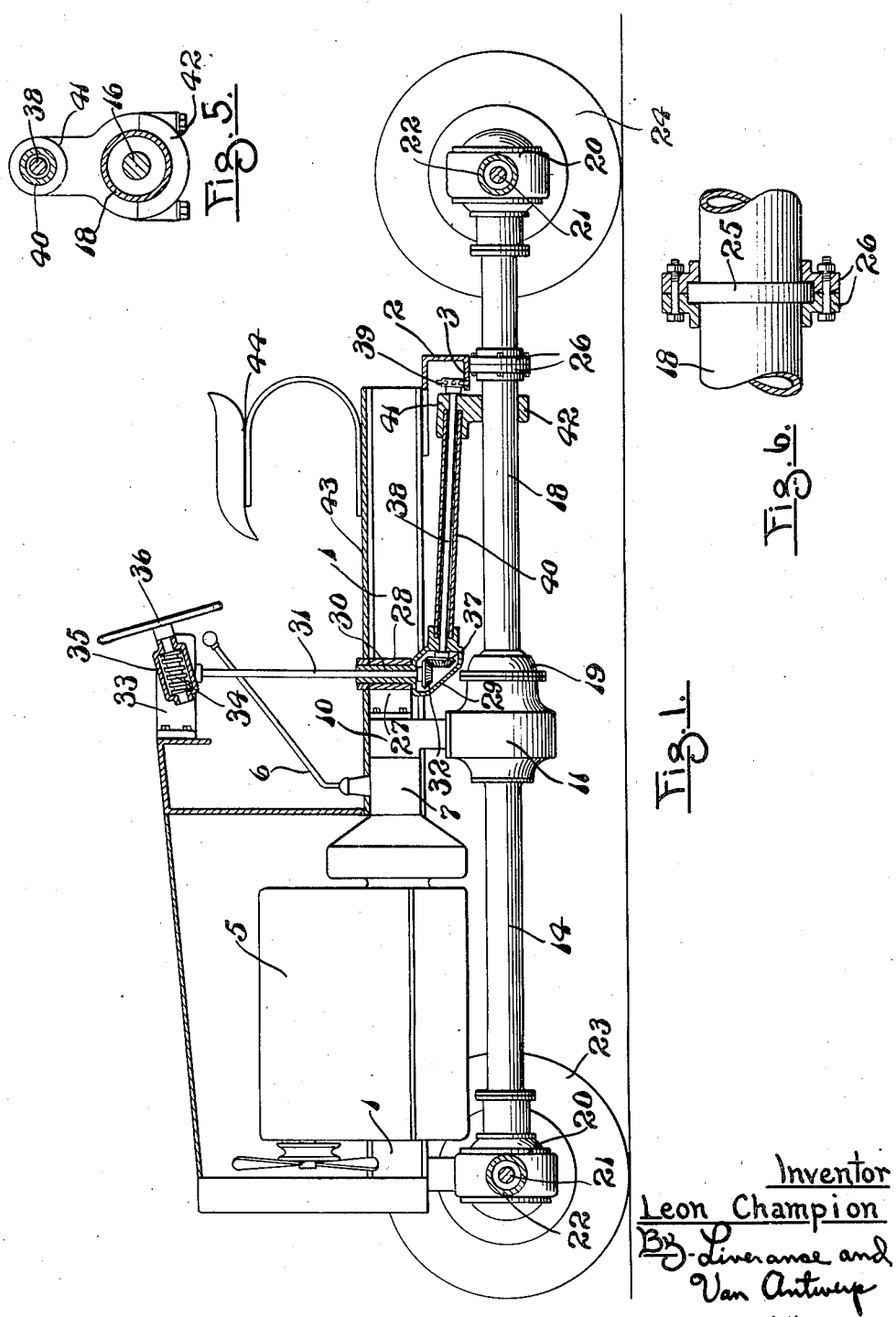

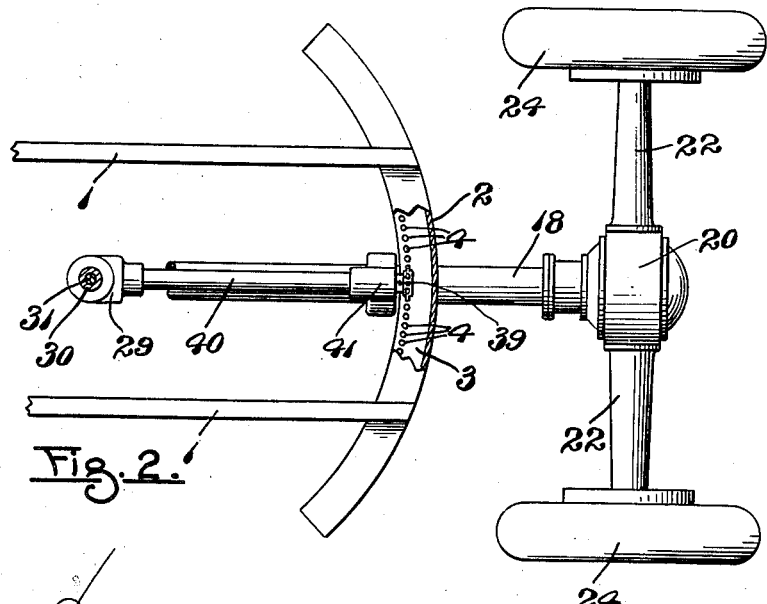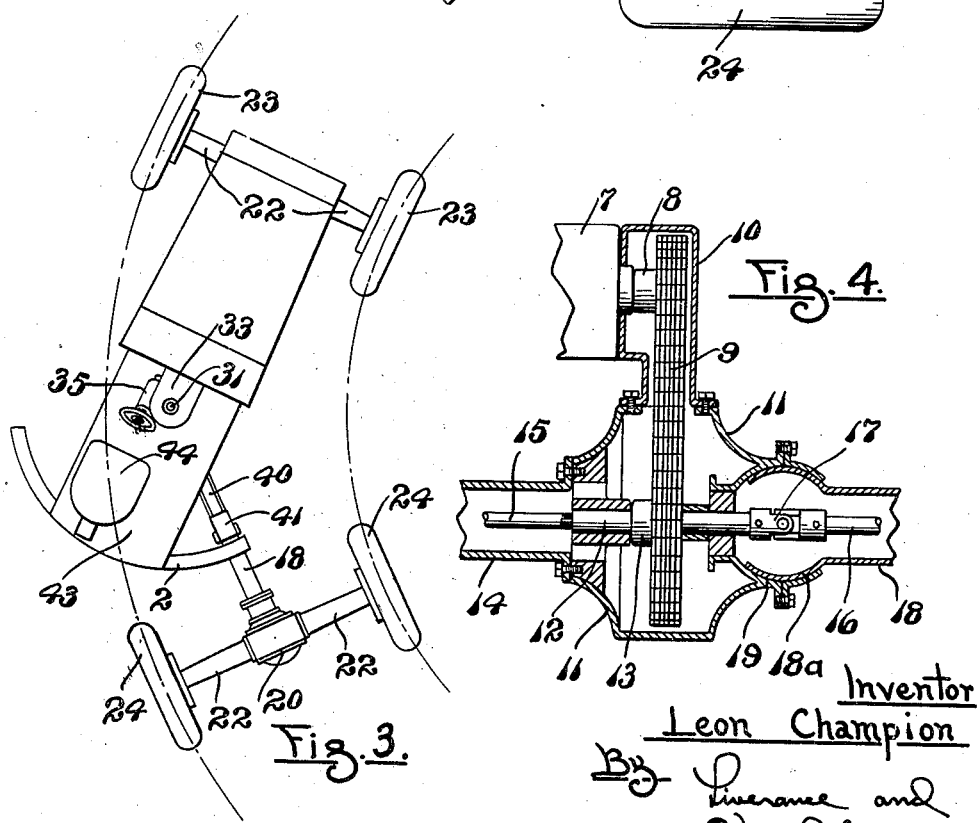

2,349,141

UNITED STATES PATENT OFFICE 2,349,141

TRACTOR

Leon Champion, Marne, Mich.

Application June 4, 1942, Serial No. 445,710

10 Claims. (Cl. 180—50)

This invention relates to tractors, and is concerned with novel improvements in tractors whereby all four wheels are engine driven, the rear wheels will follow in the tracks of the front wheels upon a change of direction or turning of the tractor, a major part of the tractor may be either exact standard parts used in standard motor vehicles or trucks or such standard parts with readily provided variations therein, whereby economy in production is obtained, and the tractor will be particularly adapted for use on soft ground or in snow, negotiating or traversing such ground or snow without undue expenditure of power or liability of becoming stalled.

One feature of the invention resides in the positioning and relation of the steering wheel to the universal joint connection between the front and rear propeller shafts, the first one of which drives the front wheels and the other the rear wheels of the tractor, thereby to provide assurance that the front and rear wheels on the opposite sides of the tractor will in all cases follow identical paths.

Another novel feature of the invention resides in the manner in which the tractor is steered and its direction of movement changed operating through the rear ground engaging portions of the tractor which are mounted for movement about a vertical axis, the other parts of the tractor being secured to a fixed frame. Many novel constructions are resorted to for the attainment of the invention and its objects as will be apparent upon an understanding of the invention from the following description in connection with the accompanying drawings, in which, Fig. 1 is a side elevation, partly in section, of a tractor made in accordance with my invention.

Fig. 2 is a fragmentary plan view with parts removed and shown in section of the rear part of the tractor.

Fig. 3 is a plan view of the tractor showing the operation of the steering wheel and the coincident tracks which the front and rear wheels follow.

Fig. 4 is a fragmentary enlarged vertical section showing the driving mechanism between the engine or motor of the tractor and the front and rear propeller shafts.

Fig. 5 is a vertical transverse section through the rear propeller shaft and a part of the steering mechanism above it, and Fig. 6 is a fragmentary side elevation and longitudinal vertical section through the rear portion of the rear propeller shaft housing illustrating the bearing roller mounted thereon.

Like reference characters refer to like parts in the different figures of the drawings.

The tractor frame sides, or chassis members 1 are located and secured in spaced apart relation and at their rear ends are welded or otherwise permanently connected to the upper flange of a horizontally located curved or arc shaped channel 2, the lower flange 3 of which is provided with a plurality of equally spaced consecutive openings 4, as best shown in Fig. 2.

Toward the front of the frame the engine or motor 5 is mounted being provided at its rear with the usual clutch and selective gear transmission housing 7, the gears being shifted by the gear shift lever 6 in the usual manner.

Extending from the rear of the transmission 7 (Fig. 4) is a shaft which is driven by the engine at varying speeds, depending upon the gearing connection selected, on which a pulley or wheel 8 to drive an endless chain drive 9 is mounted, said pulley and the upper portion of the chain drive being housed within a housing 10 mounted at the upper side of a second housing 11, which in practice preferably is a standard differential housing used between the rear axle housing parts of a standard automobile. Such differential housing 11 is turned so that the opening through which the propeller shaft of the automobile passes is at the upper side of the housing for the passage of the driving chain 9.

Lengthwise of the housing 11 a shaft 12 is mounted in suitable bearings for rotation (Fig. 4) on which is mounted a chain pulley 13 around which the driving chain 9 passes, the pulley 13 in practice preferably having a diameter three times the diameter of the pulley 8. A propeller shaft housing 14 of standard form is permanently secured at the front side of the housing 11, lengthwise of which is a propeller shaft 15 connected with the shaft 12. The propeller shaft 15 extends toward the front of the tractor.

A second or rear propeller shaft 16 is connected by means of a universal joint 17 with the rear end of the shaft 12. A propeller shaft housing 18 surrounds the shaft 16 and extends to the rear of the tractor back of the rear end of the frame. At the front end the propeller shaft housing 18 is modified by welding or otherwise permanently joining therewith an enlargement 18a of approximately spherical form which has universal movement in a surrounding bearing housing 19 therefor provided at the rear side of the housing 11, it being understood that the standard differential housing 11 is modified in shape so as to provide the socket housing 19 for the spherical enlargement 18a of the housing 18.

Such propeller shaft housings 14 and 18 at their front and rear ends respectively are secured to differential housings 20 from the opposite sides of which axle housings 22 extend and within which are the axles 21 driven by the propeller shafts 15 and 16 through the ordinary and well known differential gearings of rear axle automobile constructions. Front and rear wheels 23 and 24 are secured to the outer ends of the axles 21.

The arc shaped channel 2 is located a short distance over the rear propeller shaft 18 and bears upon a roller mounted on such housing. A collar 25 is secured to and around the housing 18 at the proper position, and the roller is preferably made of two halves 26 bolted together as shown in Fig. 6, free to turn about the positioning collar 25, the lower flange 3 of the channel member 2 riding against the roller. Because of the universal joint constructions, both the joint 17 between the shafts at 16 and 17 and the housings 18a and 19, the rear construction back of the housing 11 is relatively swingable about a vertical axis with reference to the frame of the tractor and the parts fixedly mounted thereon, the channel member 2 bearing against and riding upon the roller made up of the two sections 26.

In the steering mechanism of the tractor a bracket 27 terminating at its rear end in a vertical sleeve 28 is bolted to the rear side of the housing 19 (Fig. 1). A gear housing 29 is located directly below the lower end of the sleeve 28 and is provided with a hollow vertical stem 30 extending through the sleeve. A vertical shaft 31 is equipped at its lower end with a beveled gear 32 within the housing 29 and extends to a worm gear housing 33, connecting with a worm gear (not shown) within said housing which is in mesh with a worm 34 in a housing 35 at a side of the housing 33. The worm 34 may be manually turned by a steering wheel 36 fastened at the outer end of the worm shaft.

A second beveled gear 37 within the housing 29 is in meshing engagement with the gear 32. It is fixed to the front end of a shaft 38 which extends to the rear and downwardly at a slight angle and is equipped at its rear end with a spur wheel 39 having projecting bosses to enter the openings 4 previously described in the lower flange 3 of the curved channel member 2.

A tubular housing 40 is welded at its front end to the housing 29 and similarly welded at its rear end to a cast member 41 which embraces the upper side of the propeller shaft housing 18 and to which a completing collar portion 42 to go around the lower side of the housing 18 is bolted (Fig. 5).

A plate or platform 43 covers the space between the frame side members 1 back of the engine and is permanently connected with said frame members, above which is a spring supported seat 44 for the driver so that the steering wheel 36, gear shaft lever 6, and of course the clutch controlling pedal (not shown) are readily accessible by the driver.

It will be noted and should be clearly understood that the vertical axis of the shaft 31 is in a vertical plane coincident with the axes about which the members of the universal joint 17 turn. With such construction an operation of the steering wheel 36 driving the shaft 38 and the wheel 39 at its rear end swings the frame and front wheels of the tractor with relation to the rear wheels thereof, for example, as indicated in Fig. 3; and the tracks produced by the front wheels will be the tracks followed by the rear wheels indicated in dot and dash lines in Fig. 3. The members 41 and 42 embracing the propeller shaft housing 18 are loose and not fixed thereon. A tendency of such members to turn about the shaft on operating the steering gearing is resisted by the tube 40 through its permanent welded connection at its ends respectively to the housing 29 and the member 41.

The tractor described has been built and used and is in steady use and has proven to be very satisfactory. The major portion of the parts are available as standard stock parts of automobile construction, and can be obtained new or, preferably, from obsoleted automobiles. The four-wheel drive is advantageous inasmuch as the front wheels are not merely pushed over the ground but exert a tractive force thereupon. The construction is relatively light enabling it to be used upon soft ground while the coincident paths of the front and rear wheels, following by reason of the coincidence of the vertical axis of the steering shaft 31 with the center of the universal joint connections produces harder and in a measure packed earthen or snow tracks for the rear wheels to follow. This insures very materially against stalling and bogging down of the tractor on soft ground or in the snow.

Having fully described my invention and a preferred embodiment thereof, what I claim and desire to secure by Letters Patent is as follows:

1. In a tractor, front and rear driven axles with wheels thereon, alined front and rear propeller shafts for driving said axles, a universal joint connecting said propeller shafts, a frame connected in rigid relationship with the front propeller shaft, steering means having a pivotal mount on said frame and extending to and connected with the rear propeller shaft including a vertical shaft adapted to be manually turned, the axis of which is in vertical alinement with the center of said universal joint, a second shaft driven by the vertical shaft provided at its rear end with gearing connection with said frame, and means holding said second shaft against swinging movement with respect to the rear propeller shaft, for the purposes specified.

2. In a tractor, front and rear driven axles with wheels thereon and front and rear propeller shafts connected with and driving said axles all of said axles having housings, a universal joint connecting the propeller shafts, a housing for the universal joint, a frame mounted on said front axle and universal joint housings in fixed relation thereto, a roller on the rear propeller shaft housing upon which the rear portion of the frame bears, a motor mounted on the frame, means for driving said propeller shafts from said motor, steering means including a gear housing pivotally mounted to turn about a vertical axis with respect to said frame, a vertical shaft extending from within and above the housing, the axis thereof being vertically alined with the center of said universal joint, a second shaft extending into said housing and to the rear therefrom, gears on said shafts within said gear housing in mesh with each other, a member mounted on the rear propeller shaft housing through which the second shaft passes, a tube surrounding said second shaft and permanently secured at its end to said gearing housing and said member, said second shaft at its rear end having a gear mounted thereon and said frame at its rear portion having a rack with which said gear engages, as specified.

3. In a tractor, front and rear driven axles, front and rear propeller shafts in alinement to drive shaft axles, housings for said axles and propeller shafts, a universal joint connecting the propeller shafts, a housing for said joint, a frame mounted upon and above the front axle housings and extending rearwardly therefrom and mounted for movement upon the rear propeller shaft housing, steering means mounted on said frame for relative pivotal movement with respect thereto and connected with said rear propeller shaft housing and engaging with the rear portion of the frame, the operation thereof causing a relative swinging movement of said frame with respect to said rear propeller shaft, its housing and said rear axle, the pivotal connection of the steering mechanism to the frame having a vertical axis about which to turn which is substantially alined with the center of movement of said universal joint.

4. In a tractor, a frame carrying an engine thereon, a front axle with housing therefor, the front portion of the frame having fixed relation to said axle and its housing, alined front and rear propeller shafts having housings, the adjacent ends of which are provided with universal joint connections, a universal joint connecting said propeller shafts, a rear axle and housing therefor, wheels at the ends of said axles, said frame at its rear portion having an arc shaped member lying over the rear propeller shaft housing, a roller on said propeller shaft housing upon which said arc shaped member rides, a steering gear including a vertical shaft and a rearwardly extending shaft with gears at adjacent ends in mesh, a housing for said gears mounted for pivotal movement about a vertical axis, means at the free end of said vertical shaft for manually turning it, gearing means at the rear end of said rearwardly extending steering gear shaft connected with said arc shaped member, and means to prevent lateral movement of said rearwardly extending steering gear shaft relative to said rear propeller shaft housing whereby changing the relative position of said frame with respect to the rear propeller shaft follows on manual operation of said steering means.

5. In a tractor, a frame, a front axle with housings secured below the frame, a propeller shaft housing extending rearwardly therefrom, a front propeller shaft connected with said axle, a housing at the rear end of said propeller shaft housing, an engine carried by the frame above said propeller shaft housing having a transmission gear housing at its rear, a housing connected at the rear of the transmission gear housing and connecting to the housing at the rear of said propeller shaft housing, driving means between the said propeller shaft and the engine within said last mentioned housings, a second propeller shaft housing adapted to be alined with the first propeller shaft housing having a universal connection with the housing at the rear of said first propeller shaft housing, a roller mounted on the second propeller shaft housing, an arc shaped transverse member at the rear end of the frame riding on said roller, a rear axle and housings therefor at the rear end of the second propeller shaft housing, a rear propeller shaft, a universal joint connecting the propeller shafts, a bracket provided with a vertical sleeve secured at the rear side of the housing at the rear end of the gear shaft, a steering gear housing located below said sleeve, a vertical stem on said steering gear housing extending upwardly through the sleeve, a vertical shaft extending through said stem, a beveled gear at the lower end of the stem within the steering gear housing, a second shaft provided with a beveled gear at its front end in mesh with the first beveled gear, said second shaft extending rearwardly over the second propeller shaft housing, an anchor member loosely mounted on the second propeller shaft housing and extending thereabove through which said second shaft passes, a gear at the rear end of said second shaft, rack means on said arc shaped member of the frame with which said gear engages, a tube surrounding said second shaft secured at its ends to said anchor member and to said steering gear housing, and hand wheel operated means for manually turning said vertical shaft.

6. In combination, a chassis frame supported at its front by front axle and wheels, a rear axle and wheels, said rear axle having housings, a propeller shaft for driving the rear axle, a propeller shaft housing for the propeller shaft, means for driving said propeller shaft, a universal joint connection between said driving means and propeller shaft and a universal mounting for the front end of the propeller shaft housing, the rear portion of the frame being supported upon said propeller shaft housing for relative movement of one with respect to the other, manually operated steering means including a rack at the rear portion of the frame and a pinion engaging therewith and a shaft on which the pinion is mounted adapted to be manually turned, said shaft lying over and substantially paralleling the propeller shaft, and a member mounted on the propeller shaft and extending thereabove through which said pinion shaft passes, whereby on turning the shaft the rear end of the frame and said propeller shaft housing and associated parts are moved relative to each other.

7. In a structure of the class described, a chassis frame, a front axle and wheels supporting the front portion thereof, said axle held in substantially fixed relation to the frame, a driven rear axle and wheels back of the rear portion of the frame, said rear axle having housings, a propeller shaft for driving the rear axle, means for driving the propeller shaft including a universal joint connection at its front end, a propeller shaft housing for the propeller shaft having a universal mounting at its front end, a steering means including a gearing housing mounted to turn about a vertical axis which passes through the center of said universal joint, a shaft having a gear thereon located in said housing, the shaft extending rearwardly over said propeller shaft, a transverse arc shaped rack at the rear of the frame, a pinion on the rear end of said shaft engaging with the rack, a member loosely mounted on the propeller shaft housing through which said shaft passes, a tube fixed at its ends to said gearing housing and said member through which said shaft passes, and manually operated means including a gear meshing with said first mentioned gear for turning said shaft.

8. A construction containing the elements in combination defined in claim 7, combined with a roller mounted on said propeller shaft housing to turn therearound against which said transverse rack carrying member of the frame bears, as specified.

9. A tractor comprising a frame, an engine mounted on said frame, an axle and wheels supporting the forward end of the frame, an axle and wheels at the rear of the frame, a propeller shaft connected with said rear axle and with said engine for driving said rear axle, a housing surrounding said propeller shaft, a universal joint in said propeller shaft and housing, means for mounting the rear of said frame on said propeller shaft housing for lateral movement relative to each other and steering mechanism for moving said rear part of the frame laterally relative to the rear axle and wheels.

10. A tractor comprising a frame, an engine mounted on said frame, an axle and wheels supporting the forward end of the frame, an axle and wheels at the rear of the frame, a propeller shaft connected with said rear axle and with said engine for driving said rear axle, a housing surrounding said propeller shaft, a universal joint in said propeller shaft and housing, a roller on said propeller shaft housing, said roller supporting the rear part of said frame for lateral movement relative to the rear axle and wheels, a rack on the rear part of said frame, a gear anchored to said propeller shaft housing and meshing with said rack and means to rotate said gear to move said rear axle and wheels laterally relative to the frame.

LEON CHAMPION.